(No Model.)
J. F. KERSTETER.
DEVICE FOR SUSPENDING STOVE LID LIFTERS, &c.
No. 558,817. Patented Apr. 21, 1896.
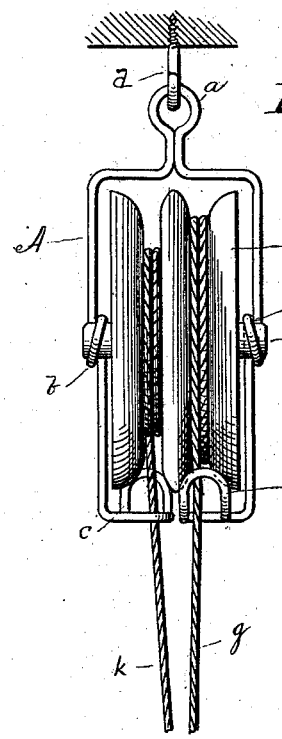
Fig. 1.
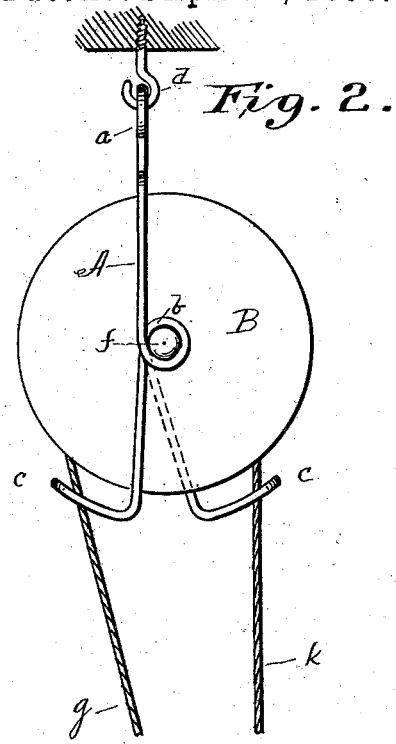
Fig. 2.
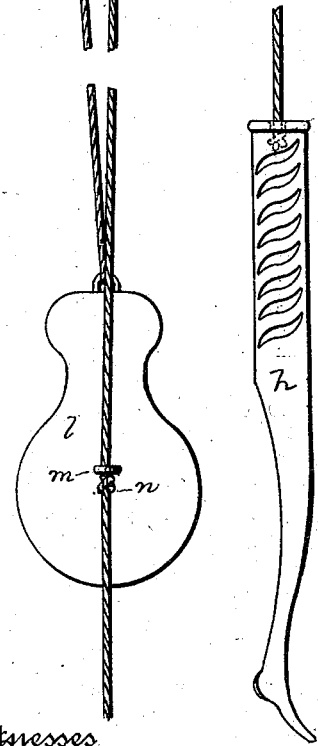
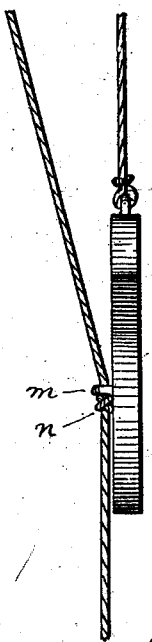
Witnesses
Jas. N. Blackwood
H. W. Cragin
Inventor
John F. Kersteter
per Washn. Ritford
Attorney

UNITED STATES PATENT OFFICE.

JOHN F. KERSTETER, OF MILTON, PENNSYLVANIA, ASSIGNOR TO THE STAR NOVELTY COMPANY, LIMITED, OF SAME PLACE.

DEVICE FOR SUSPENDING STOVE-LID LIFTERS, &c.

SPECIFICATION forming part of Letters Patent No. 558,817, dated April 21, 1896.

Application filed November 27, 1895. Serial No. 570,255. (No model.)

*To all whom it may concern:*

Be it known that I, JOHN F. KERSTETER, a citizen of the United States, residing at Milton, in the county of Northumberland and State of Pennsylvania, have invented certain new and useful Improvements in Devices for Suspending Stove-Lid Lifters, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a device for suspending any utensil—such as a pot-lifter, stove-lid lifter, chalk-receptacle, &c.—in a position to be readily taken hold of and drawn down when desired, at the same time preventing misplacement or loss thereof and keeping it out of the way when not in use.

The nature of my invention will be described below, and pointed out in the claim.

In the drawings, Figure 1 is a front elevation. Fig. 2 is a side elevation.

Like letters refer to like parts.

A represents the hanger or pulley-frame. It is formed of a single piece of wire, extending about the pulley, as shown, and bent to form an attaching-loop $a$, central journal-loops $b$, and cord-guides and separators $c$. Loop $a$ can easily be attached to or detached from the screw-hook $d$, which may be screwed into the ceiling or wherever convenient.

B is a double pulley, and $f$ its shaft, journaled in loops $b$. On the right half of said pulley is wound a cord $g$, and to its lower end may be attached, for instance, a stove-lid lifter $h$, (shown broken away in Fig. 1,) or any desired utensil. On the left half of the pulley is oppositely wound another cord $k$, having at its lower end a weight or counterbalance $l$. Hence when the utensil is pulled down the weight is drawn up, and when the weight falls the utensil is drawn up out of the way. To hold the cords $g$ $k$ apart and to permit of easy operation, the loops $c$ are not on the same vertical plane, the loop for cord $k$ being to the rear of the other. (See Fig. 2.) To hold at an angle and further prevent twisting of the cords and to prevent the utensil from being drawn up too far, cord $g$ passes through an eye $m$, attached to the weight, and is knotted at $n$, said knot forming a stop.

Having described my invention, what I claim, and desire to secure by Letters Patent, is—

The combination with a suitable support, of the wire pulley-frame bent to form an attaching-loop, central journal-loops, and the lower cord-guides or separators in different vertical planes, a double pulley having its shaft journaled in the central loops, a cord partly wound upon one portion of said pulley and passing through the eye on the counterbalance, and provided with a utensil at its lower end and a stop at a suitable distance above, and a cord having a counterbalance with a lateral eye or guide, said cord partly and oppositely wound upon the other portion of said pulley, as set forth.

In testimony whereof I affix my signature in presence of two witnesses.

JOHN F. KERSTETER.

Witnesses:
 CHAS. O. MEIXELL,
 ANDREW F. IRWIN.